United States Patent [19]
Kohn

[11] Patent Number: 5,604,627
[45] Date of Patent: Feb. 18, 1997

[54] OPTICAL AMPLIFIER DEVICE

[75] Inventor: Ulrich Kohn, Backnang, Germany

[73] Assignee: Robert Bosch GmbH, Stuttgart, Germany

[21] Appl. No.: 599,817

[22] Filed: Feb. 12, 1996

[30]     Foreign Application Priority Data

May 18, 1995 [DE] Germany .................. 195 18 294.4

[51] Int. Cl.⁶ .............................. H01S 3/00; H04B 10/00
[52] U.S. Cl. ...................... 359/341; 359/124; 359/337; 359/349
[58] Field of Search .................... 359/124, 127, 359/337, 341, 349; 385/1, 31

[56]          References Cited

U.S. PATENT DOCUMENTS

| 4,606,632 | 8/1986 | Hillerich | 356/73.1 |
|---|---|---|---|
| 5,361,157 | 11/1994 | Ishikawa et al. | 359/168 |
| 5,500,763 | 3/1996 | Ota | 359/333 |
| 5,539,566 | 7/1996 | Terahara et al. | 359/341 |

FOREIGN PATENT DOCUMENTS

| 0445364 | 11/1990 | European Pat. Off. |
|---|---|---|
| 2274939 | 11/1987 | Japan. |

OTHER PUBLICATIONS

Trutschel et al, ECIO '95 Proc. 7th Europ. Conf. on Integ. Opt., p. 5 vol. 1, (603) pp. 173–176, Apr. 3, 1995; abst. only. herewith.

Pezeshki et al, IEEE Photonics Tech. Lett., vol. 6, #10, pp 1225–1227, Oct. 1994. abst. only herewith.

*Primary Examiner*—Nelson Moskowitz
*Attorney, Agent, or Firm*—Michael J. Striker

[57]                ABSTRACT

The optical amplifier device for an optical transmission system with bidirectional wavelength multiplex to a light transmission wave guide includes a first optical amplifier (OV1) for amplifying signals of a first wavelength ($\lambda_1$) in a first direction; a second optical amplifier (OV2) for amplifying signals of a second wavelength ($\lambda_2$) in a second direction; a first wavelength selective coupler (WDM1) connecting the input of the first optical amplifier (OV1) and the output of the second optical amplifier (OV2) with a light transmission wave guide (Ü) and a second wavelength selective coupler (WDM2) connecting the input of the second optical amplifier (OV2) and the output of the first optical amplifier (OV1) with the light transmission wave guide (Ü). Because of reflections noise amplification due to resonance would be considerable but according to the invention the noise resonances are prevented since the wavelength selective couplers (WDM1, WDM2) have a signal attenuation of 3 dB at different wavelengths.

3 Claims, 1 Drawing Sheet

5,604,627

OPTICAL AMPLIFIER DEVICE

BACKGROUND OF THE INVENTION

The present invention relates to an optical amplifier device for an optical transmission system and, more particularly, to an optical amplifier device for an optical transmission system with bidirectional wavelength multiplex to a light transmission waveguide.

An optical amplifier device is known for an optical transmission system with bidirectional wavelength multiplex to a transmission wave guide. The known optical amplifier device includes a first optical amplifier for amplifying signals of a first wavelength in a first direction; a second optical amplifier for amplifying signals of a second wavelength in a second direction; a first wavelength selective coupler connecting the input of the first optical amplifier and the output of the second optical amplifier with the light transmission wave guide and a second wavelength selective coupler connecting the input of the second optical amplifier and the output of the first optical amplifier with the light transmission wave guide.

An optical amplifier device of the above-described kind is described in European Published Patent Application EP 445 364 A2. An optical transmission system with wavelength multiplex is described in this reference in which a wavelength selective coupler is arranged upstream and downstream of an optical amplifier and the second light guide inputs of the couplers are connected with each other by an optical amplifier. The first optical amplifier amplifies signals of a first wavelength and the second optical amplifier amplifies signals of a second wavelength. To prevent noise in the amplification path due to multiple reflections which cause a deterioration of the signal-to-noise ratio due to the retarded useful signal components, low reflecting wavelength selective couplers are of particularly great significance.

SUMMARY OF THE INVENTION

It is an object of the present invention to provide an optical amplification device which does not have the above-described disadvantage and which avoids amplification of noise due to resonances caused by reflections in the wave guide.

This object and others which will be made more apparent hereinafter are attained in an optical amplifier device for an optical transmission system with bidirectional wavelength multiplex to a light transmission wave guide which includes a first optical amplifier for amplifying signals of a first wavelength in a first direction; a second optical amplifier for amplifying signals of a second wavelength in a second direction; a first wavelength selective coupler connecting the input of the first optical amplifier and the output of the second optical amplifier with a light transmission wave guide and a second wavelength selective coupler connecting the input of the second optical amplifier and the output of the first optical amplifier with the light transmission wave guide.

According to the invention each wavelength selective coupler has at least two light transmission paths, the transmittance as a function of wavelength is different along each light transmission path in a particular coupler but the transmittance along each light transmission path of the first wavelength selective coupler is equal at a first predetermined wavelength $\lambda_i$ and the transmittance along each light transmission path of the second wavelength selective coupler is equal at a second predetermined wavelength $\lambda_{i'}$; and the predetermined wavelength $\lambda_i$ of the first wavelength selective coupler is selected so that it is different from the second predetermined wavelength $\lambda_{i'}$ of the second wavelength selective coupler.

Observation of the oscillation properties of an optical amplifier device according to the current state of the art showed that when external reflections occur the oscillation properties are wavelength dependent. A wavelength exists at which a signal is attenuated only about 3 dB in the ideal attenuation-free wavelength selective coupler. This ideal coupler operates at this wavelength as a 3-dB coupler (power divider). This 3-dB point exists only in the ideal attenuation-free coupler. In real amplifier device these values are standard: 3-dB +internal losses amount to :3.5 ... 4.5 dB. If this 3-dB point coincides or is the same for both wavelength selective couplers used in the amplifier device, then the amplifier device resonates at their 3dB point. To avoid this resonance the different wavelength selective couplers must have different 3-dB points.

In a preferred embodiment of the invention the wavelength selective couplers are such that the first predetermined wavelength $\lambda_i$ of the first wavelength selective coupler is less than the second predetermined wavelength $\lambda_{i'}$ of the second wavelength selective coupler when the first wavelength $\lambda_1$ is greater than the second wavelength $\lambda_2$. Advantageously each optical amplifier is a fiber optic amplifier.

BRIEF DESCRIPTION OF THE DRAWING

The objects, features and advantages of the present invention will now be illustrated in more detail by the following detailed description, reference being made to the accompanying drawing in which:

FIG. 2b is a diagrammatic representation of the wavelength selective coupler whose transmission properties are illustrated in FIG. 2a.

DESCRIPTION OF THE PREFERRED EMBODIMENTS

Figure 1:
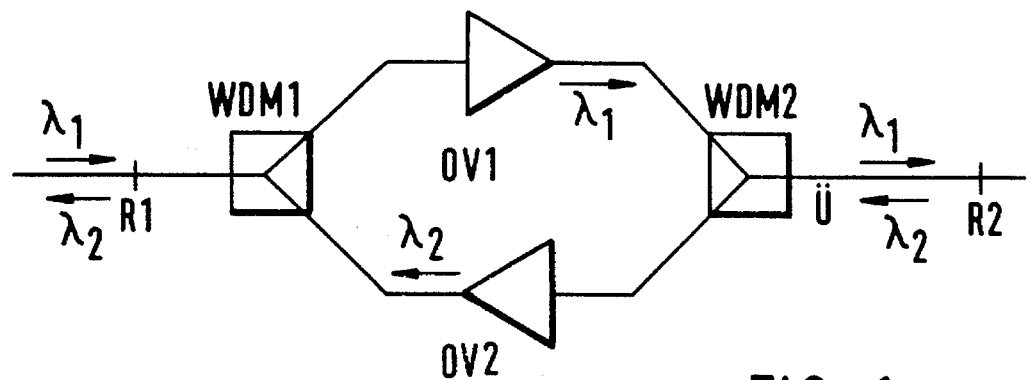
FIG. 1 is a diagrammatic representation of an optical amplifier device according to the invention.
Figure 2A:
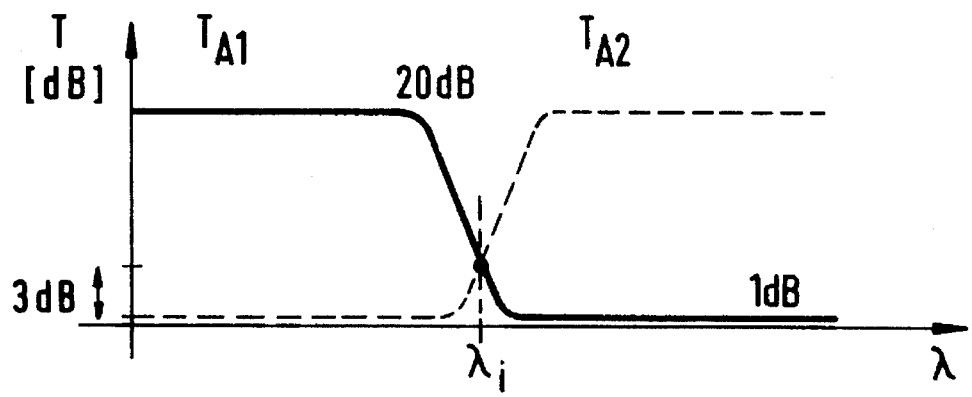
FIG. 2a is a graphical illustration of the dependence of the transmittance of the wavelength selective coupler shown in FIG. 2b on wavelength measured for respective output paths A1 and A2.
Figure 2B:
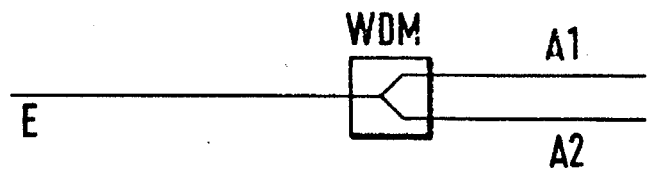

FIG. 1 shows a light transmission wave guide Ü, in which two signals of different wavelength $\lambda_1$ and $\lambda_2$ are transmitted in opposite directions. Reflection sites R1 and R2, for example at connectors, are present in the light transmission wave guide. Two wavelength selective couplers WDM1 and WDM2 are inserted in the light transmission wave guide Ü. The couplers each have a transmission attenuation which depends on wavelength in the respective individual light transmission paths A1, A2 through them. FIG. 2a shows transmission curves $T_{A1}$ and $T_{A2}$ for respective individual transmission paths A1, A2 of each wave length selective coupler (as shown in FIG. 2b). Each branch has a high transmittance for one predetermined wavelength range. The intersection point for both transmission curves for both paths gives the wavelength $\lambda_i$ for which the transmittance along both paths is the same. In an ideal loss-free coupler this corresponds to the 3 dB-point. This 3 dB-point is also the point at which the signal for the wavelength $\lambda_i$ experiences a damping of 3 dB in the respective branches of the coupler.

The first branch or output path of the wavelength selective coupler WDM1 is connected to the input of a first amplifier OV1 which amplifies the signals of the wavelength $\lambda_1$. The second branch or output path of the wavelength selective coupler WDM1 is connected with the output of a second amplifier OV2 which amplifies the signals of wavelength $\lambda_2$. The second wavelength selective coupler WDM2 connects the output of the first optical amplifier OV1 and input of the second optical amplifier OV2 with the light transmission waveguide Ü. Both wavelength selective couplers are formed so that signals of the wavelength $\lambda_1$ in the first wavelength selective coupler WDM1 are conducted to the first optical amplifier OV1 and signals of wavelength $\lambda_2$ in the second wavelength selective coupler WDM2 are conducted into the second optical amplifier OV2. However signal components of the wavelength $\lambda_1$ are also present in the light wave guide due to reflections at the reflection sites R1 and R2 of noise produced in the amplifiers.

According to the invention a first predetermined wavelength $\lambda_i$ (i.e. the wavelength at which the transmittance is the same for both paths through the first coupler) of the first wavelength selective coupler is different from the wavelength $\lambda_{i'}$ (i.e. the wavelength at which the transmittance is the same for both paths through the second coupler) of the second wavelength selective coupler WDM2. Because of that, despite the reflections, resonances do not occur in the amplifier device according to the invention until at very much higher amplification factors and/or poorer reflection factors. For the case that the wavelength $\lambda_2$ is less than the wavelength $\lambda_1$ the first predetermined wavelength $\lambda_i$ for the first wavelength selective coupler WDM1 should be less than the second predetermined wavelength $\lambda_{i'}$ for the second wavelength selective coupler WDM2.

While the invention has been illustrated and described as embodied in an optical amplifier device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An optical amplifier device for an optical transmission system with bidirectional wavelength multiplex to a light transmission wave guide, said optical amplifier device comprising a first optical amplifier (OV1) for amplifying signals of a first wavelength ($\lambda_1$) in a first direction, said first optical amplifier (OV1) having an input and an output; a second optical amplifier (OV2) for amplifying signals of a second wavelength ($\lambda_2$) in a second direction, said second optical amplifier (OV2) having an input and an output; a first wavelength selective coupler (WDM1) connecting the input of the first optical amplifier (OV1) and the output of the second optical amplifier (OV2) with a light transmission wave guide (Ü) and a second wavelength selective coupler (WDM2) connecting the input of the second optical amplifier (OV2) and the output of the first optical amplifier (OV1) with said light transmission wave guide (Ü);

wherein each of said wavelength selective couplers (WDM1, WDM2) has two light transmission paths (A1, A2), the dependence of transmittance on transmitted light wavelength differs along each of said light transmission paths (A1, A2) for each of said wavelength selective couplers but the transmittance along each of said light transmission paths (A1, A2) of said first wavelength selective coupler (WDM1) is equal at a first predetermined wavelength ($\lambda_i$) and the transmittance along each of said light transmission paths (A1, A2) of said second wavelength selective coupler (WDM2) is equal at a second predetermined wavelength ($\lambda_{i'}$); and said predetermined wavelength ($\lambda_i$) of said first wavelength selective coupler (WDM1) is different from said second predetermined wavelength ($\lambda_{i'}$) of said second wavelength selective coupler (WDM2).

2. The optical amplifier device as defined in claim 1, wherein said wavelength selective couplers (WDM1, WDM2) are such that said first predetermined wavelength ($\lambda_i$) of said first wavelength selective coupler (WDM1) is less than said second predetermined wavelength ($\lambda_{i'}$) of said second wavelength selective coupler (WDM2) when the first wavelength ($\lambda_1$) is greater than the second wavelength ($\lambda_2$).

3. The optical amplifier device as defined in claim 1, wherein each of said optical amplifiers is a fiber optic amplifier.

* * * * *